July 7, 1959      J. H. BACON      2,893,089
DEVICE FOR COUPLING PLASTIC ELEMENTS AND BEADED CHAINS
Filed March 22, 1956
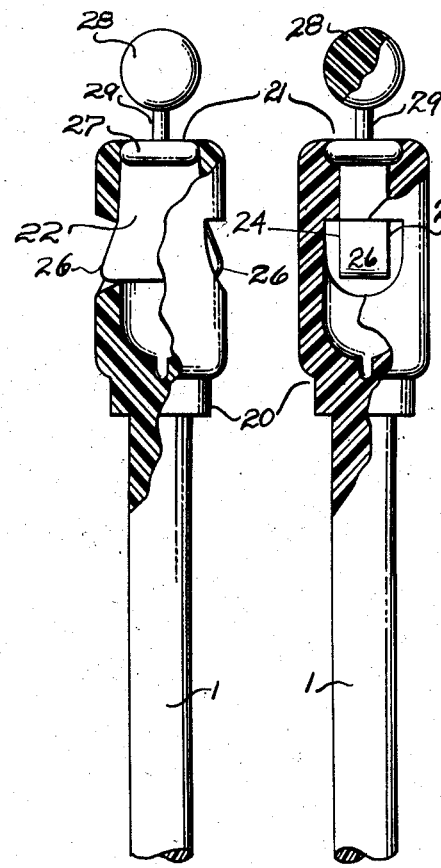
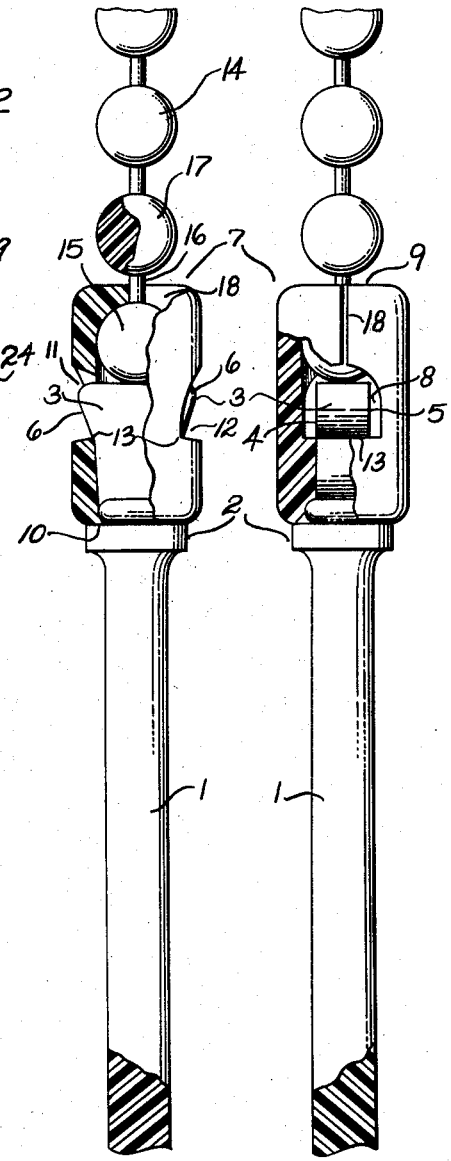
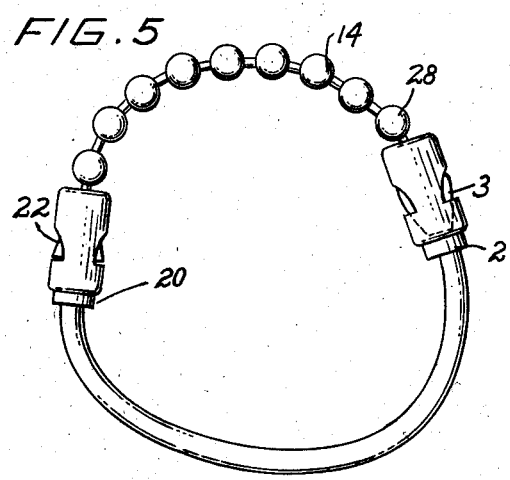
INVENTOR.
John H. Bacon
BY Ezekiel Wolf
his Attorney

# 2,893,089

DEVICE FOR COUPLING PLASTIC ELEMENTS AND BEADED CHAINS

John H. Bacon, Wellesley Hills, Mass.

Application March 22, 1956, Serial No. 573,263

6 Claims. (Cl. 24—116)

The present invention relates to a device for coupling conventional beaded chains to plastic elements.

It is very often desirable to be able to connect some plastic element to a beaded chain. For example, a plastic handle or an elongated plastic cord, attached to the end of a chain pull in an electric light fixture, will often facilitate the use of this fixture and, in many cases, will make the chain itself more easily accessible to many people.

In the past, where such an extension to a chain is desired, or a handle is attached to the end of the chain, improvised means are generally used for such attachment with the resulting effect that the attached element will very often come loose from the chain.

It is also desirable, as an example, to insert plastic elements in a length of beaded chain for any variety of purposes, such as good-luck charms on key chains.

The present invention provides a structure which satisfactorily overcomes the objections previously mentioned and attains substantial advantages over prior-known structures.

In the present invention there is provided a means by which plastic elements, such as cords or handles, may be attached quite readily to the end of a beaded chain in such a manner as to provide a structure in which the plastic elements may not readily be removed from the end of the chain. This structure may readily be used to provide handles or elongated cords to beaded chains and may provide plastic elements attached to beaded chains for any number of other purposes.

The present invention also provides a structure in which a plastic member may, if desired, be attached to the conventional metal clip used to secure ends of a beaded chain together, or may, if desired, be also connected to a light structure of plastic material. By this arrangement, an elongated member may, for example, be connected in a ring to its own length, or may alternately be connected to a beaded chain.

These and other objects of the present invention will be more clearly understood when considered in connection with the accompanying drawing in which:

Figure 1 is a partially fragmentary and cross-sectional front elevation of one form of the invention, Figure 2 is a partially fragmentary and cross-sectional side view of the figure illustrated in Figure 1, Figure 3 is a partially fragmentary and cross-sectional front view of a preferred form of the invention, Figure 4 is a side view of the view shown in Figure 3, also partially fragmentary and cross-sectional, and Figure 5 is a plan view of a modification of the invention.

Referring first to the preferred form of the invention as illustrated in Figures 3 and 4, there is shown an elongated plastic body 1. In the body this plastic element 1 is illustrated as being substantially circular in cross-section. However, it should be understood that other shape forms may also be used. As for example, flat shape, irregular shape or shapes in the configurations of articles such as rings, or diamonds, all of which might be used for handles or similar articles, may be used. For the purpose of this application, however, it should be understood that reference to the elongated form 1 could apply equally as well to other shape forms.

At one end 2 of this elongated form 1 there is provided integrally with the form 1 a male probe 3. This male probe 3 is preferably flat on either front or reverse side 4 and 5 and at its side edges has projecting probes 6. The male probe 3 and the elongated form 1 itself are formed preferably of a fairly rigid plastic, such as polystyrene.

Also illustrated in Figures 3 and 4 is a female engaging clip or member 7. This member 7 is formed of a fairly resilient plastic material, such as polyethylene. This member 7 is preferably generally cylindrical in shape with an inner opening constituting a center portion 8 which runs substantially the length of the member 7, terminating short of its upper end wall 9, but extending through its lower end wall 10, thereby forming a mouth opening at the bottom. A pair of openings 11 and 12, preferably aligned with one another, extend through the side walls of the member 7 into the opening 8, thereby forming engaging edges 13 which extend partially across the inner side of the opening 8. These engaging edges are adapted to engage the projecting probes 6 when the male probe 3 is forced into the opening 8 through the lower mouth opening. A conventional beaded chain 14 is illustrated in secured engagements with this member 7. The lowermost bead 15 is positioned within the opening 8 and is connected by the interconnecting link 16 to the next adjacent bead 17 which is positioned on the outside of the member 7. The lowermost bead 15 fits snugly against the inner wall of the opening 8 at the top of this opening 8. It is secured in this position by the engagement of the male probe 3 with the bead itself. As this male probe 3 is securely held in place by engagement of the edges 13, there is no possibility of the bead 15 being accidentally dislodged from its position. A slot 18, extending from the opening 12 upwardly through the wall of the member 7, provides a passage for the link 16 on insertion of the bead 15. It should be noted that the opening 12, through which the bead 15 is inserted into position, is slightly smaller than the bead itself. This, therefore, requires that the member 7 be distorted slightly on insertion of the bead into position. As the member 7, however, is formed of a fairly resilient material and somewhat flexible material, this insertion may readily be accomplished.

Referring now to the structure as illustrated in Figures 1 and 2, there is shown an elongated member 1 which has formed at one end a female section 20. This female section, except for the fact that it is integrally secured to the member 1, is substantially identical to the female engaging member 7, previously described. The mouth opening 21 of this female section 20 is adapted to receive a coupling unit 22. This coupling unit 22 is formed of a rigid material and may, if desired, be formed of a material such as a metal. The unit 22 is provided with flat front and rear surfaces 24 and has projecting probes 26 extending from either side edge at the bottom of said unit. At the to pof this unit there is provided an enlarged collar-like member 27 from which there extends a sphere 28. This sphere 28 is interconnected to the collar 27 by a link 29 which rigidly secures the sphere in fixed relationship to the collar portion 27 of the coupling unit.

This coupling unit 22 is adapted to be forced into the mouth opening 21 of the female section 20 to engage it in a relatively strong coupling engagement. The unit 22 is secured within the opening of this female section 20 in a manner similar to that described in connection with the structure of Figures 3 and 4. However, in this unit the sphere 28 projects from the end of the elongated form in such a manner as to make it particularly adaptable for engagement with female engaging clips or member, such as illustrated at 7 in Figures 3 and 4. In this connection, it should be understood that, if desired, the units illustrated in Figures 1 and 2 may be formed at one end of an elongated member; while the unit shown in Figures 3 and 4 may be formed at the other end of the same structure, thus, providing a structure which, if desired, may be either connected with its ends interengaging, or may, if desired, be connected to a bead chain, as illustrated in Figures 3 and 4. Such an arrangement is illustrated in Figure 5. Furthermore, in this structure, either end of such a unit could be connected to a bead chain by the simple expedient of engaging the sphere 28 in the usual clip formed of metal by which present existing structures are interconnected. Further, if these units are placed at either end of an elongated form, they may be disassociated with beaded chains and connected in a ring-like structure after removal of the beaded chain 14 and the coupling unit 22 from the respective ends. After such removal, one end will provide a male probe and the other, a female section adapted to receive the male probe. Thus, in the present invention, there is provided a structure which is adapted for multipurpose uses.

Having now described my invention, I claim:

1. A fastening device adapted to engage a beaded chain comprising a plastic engaging clip having an enclosing wall forming a hollow center portion adapted to receive an end bead of said chain, and means adapted to be secured to said chain and for securing said bead at one end of said hollow center portion including a probe positioned within said hollow center portion adjacent said bead.

2. A fastening device adapted to engage a beaded chain comprising a plastic engaging clip having an enclosing wall forming an elongated hollow center portion adapted to receive an end bead of said chain at one end, means forming an opening in said wall opposite said end, means forming a male probe projecting through said opening, means forming an engaging element in said wall adapted to secure said probe against said bead thereby the bead will be firmly secured within said hollow center portion by said probe.

3. A fastening device adapted to engage a beaded chain comprising a plastic engaging clip having an enclosing wall forming an elongated hollow center portion adapted to receive an end bead of said chain at one end, means forming an opening in said wall opposite said end, a probe projecting through said opening, means forming openings in said wall adapted to cooperate with said wall to form engaging edges adapted to secure said probe against said bead whereby the bead will be firmly secured within said hollow center portion.

4. A fastening device adapted to interengage a beaded chain and a member having a male probe with projections formed on said probe comprising a plastic engaging clip having an enclosing wall forming an elongated hollow center portion adapted to receive an end bead of said chain, means forming an opening in said wall at one end thereof in which said probe may be secured against said bead, and means for engaging said projections.

5. A fastening device adapted to interengage a beaded chain having an end bead and a member having a male probe with projections formed on said probe, comprising a plastic engaging clip having an enclosing wall forming a hollow center portion shaped in one part to receive the end bead of said chain, means for positioning said bead within said hollow center portion, means forming an opening at one end of said wall through which said probe projects and engages said bead, and means for securing said probe in said position.

6. A fastening and coupling device comprising an elongated plastic member having male and female sections formed at opposite ends, said female section having a recess with projection engaging means formed in said recess, a removable coupling unit having at one end a male probe with projections positioned within said female recess and engaged by said engaging means and at the other a sphere, said male section having a probe with projections formed thereon, a plastic engaging clip having a hollow center portion shaped to receive both said last-mentioned probe with means to engage said projections and said sphere.

References Cited in the file of this patent
UNITED STATES PATENTS

| | | |
|---|---|---|
| 1,571,425 | Mataloni | Feb. 22, 1926 |
| 1,657,924 | Gouverneur et al. | Jan. 31, 1928 |
| 2,326,876 | Miller | Aug. 17, 1943 |